Dec. 5, 1967    F. PETERS    3,356,404
EYELET TYPE JOINTS
Filed Aug. 17, 1965

Inventor:
Fred Peters
By his Attorney
Carl E. Johnson.

3,356,404
EYELET TYPE JOINTS
Fred Peters, Carlton Hills, N.J., assignor to United Shoe Machinery Corporation, Boston, Mass., a corporation of New Jersey
Filed Aug. 17, 1965, Ser. No. 480,448
4 Claims. (Cl. 287—189.36)

ABSTRACT OF THE DISCLOSURE

An economical joint constituting a mounting means to be installed in a composite work piece having a flat, yieldable side and a relatively rigid side. The non-rotatively formed joint includes an eyelet axially receiving a screw or bolt. The eyelet has its preformed flange abutting the rigid side and its barrel is telescoped in compression against the forming head of the bolt. The head of the bolt is conical and recessed in the yieldable side for deforming the hidden end of the eyelet barrel and causing it to clamp the work piece while the bolt threads grip the eyelet barrel internally.

---

This invention relates to eyelet type joints, and more especially to an assembly for securing a bolt to an apertured work piece. The invention is herein illustrated and described as applied to mounting a threaded member, for example a bolt-like fastener, in a composite plate including a layer of foamed rubber-like material. It will be appreciated that usage of the invention is not thus limited, nor is application of the invention in its structural or method aspects restricted to the precise embodiments shown by way of example.

For some time there has been available commercially a plate comprised of a metal sheet to one surface of which there is bonded a layer of foam rubber. This layer is coated with an adhesive which is activatable for the purpose of securing the plate to a wall or other structure. While users of these composite plates have found them very satisfactory, it has been recognized that they would be more utilitarian and receive wider acceptance if they were provided with a support means in the form of a suitable fastener facilitating subsequent mounting thereon of brackets or other devices.

In view of the foregoing a primary object of this invention is to provide, in combination with an apertured work piece having a rigid side and a relatively flat, yieldable side adapted to be adhesively secured on a structure, an economical joint for mounting means arranged to extend through the aperture and from the rigid side but not projecting beyond the surface of the yieldable side of the work piece to be adhered.

Another object of this invention is to provide, in a compressible plate formed with an aperture, a joint for affixing in the aperture, with only its threaded stem protruding, a headed fastener.

To these ends, and in accordance with a novel feature of the invention, a joint in a yieldable work piece is provided by a conically headed bolt having its stem projecting, and a tubular fastener formed with an external flanged end and a barrel extending into the work piece and telescoped on the bolt stem, the bolt head being forced axially into the barrel in countersunk relation to the work piece to flare an end of the barrel therein.

A further feature of the invention resides in the method of forming a joint with a foam backed metal plate comprising, axially thrusting a conically headed screw having a radial shoulder into an aperture of the plate until the shoulder is substantially even with the surface of the foam, next thrusting an eyelet having a preformed flange and an internal diameter corresponding substantially to that of the stem of the screw axially onto the stem until the eyelet flange abuts the metal surface of the plate, and lastly pressing the screw head relative to the eyelet flange to compress the eyelet barrel into mating relation of its interior with the screw thread and upset the hidden end of said barrel on the screw shoulder.

The foregoing and other features of the invention will now be more particularly described in connection with an illustrative embodiment and with reference to the accompanying drawings thereof, in which.

Figure 1:
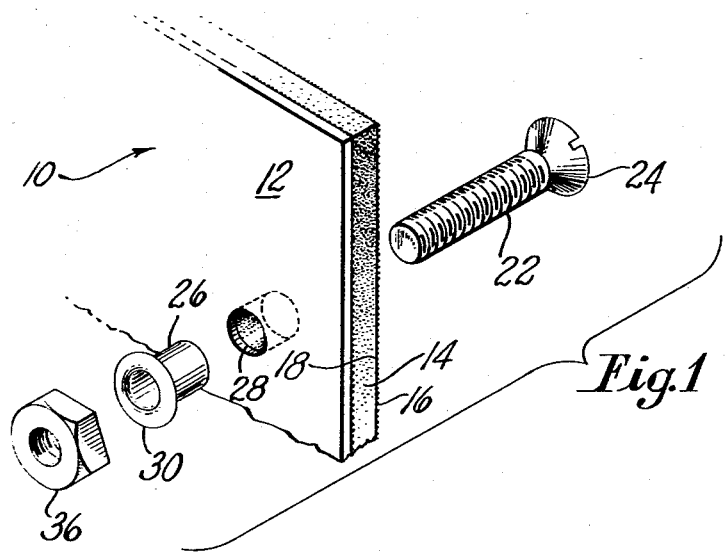
FIG. 1 is an exploded perspective view of fastener elements for forming a joint in a work piece such as a plate.

Referring to FIG. 1, a composite plate generally designated 10 to be mounted with a fastening means to be described consists of a relatively thin stiff metal sheet 12, for instance of aluminum, to which there is bonded a backing layer or pad of compressible material 14, which may be of foam rubber. An initially exposed surface 16 of the material 14 is coated with an adhesive 18 ultimately to be activated as by a suitable solvent for securing the plate 10 to a wall 20 (FIG. 3) or other structure.

Figure 2:
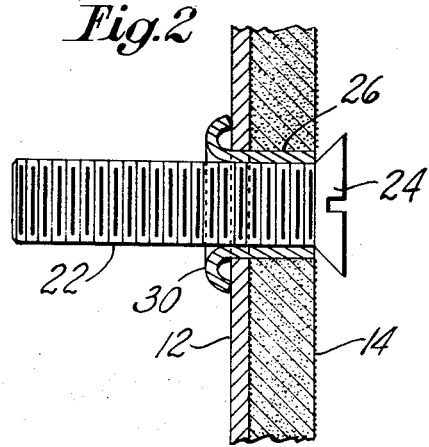
FIG. 2 is a sectional view showing the elements at an initial stage of assembly.

When the plate 10 has been mounted as above described with only its metal sheet 12 exposed, or even before such mounting, there has been considerable difficulty in providing a fastening or joint in the plate capable of insuring support for a bracket or other article. Accordingly it is now proposed to provide the unmounted plate 10 with one or more joints utilizing a threaded screw 22 having a conical head 24, and a tubular fastener in the form of a preflanged eyelet 26. A hole 28 (FIGS. 1–3), preferably circular, is first provided in the plate, and the stem of the screw, only slightly smaller in diameter, is thrust through the hole so that the base of the conical head initially engages the foam rubber as shown in FIG. 2. Next the eyelet 26 is inserted in the plate while telescoped on the screw 22 until a flanged end 30 substantially abuts the sheet 12. Lastly, by means of a kick press or other suitable means, axial pressure is applied to force the screw head toward the flanged end. The axial movement of the head 24 relative to the eyelet 26 sinks it to a level at least even with, and some times below, the coated surface 16 and simultaneously flares the end of the eyelet barrel outwardly as shown at 32 in FIG. 3. The material 14 is accordingly dilated and compressed in the locality adjacent to the hidden barrel end, and the eyelet flanges cooperate to clamp the screw 22 securely to the plate 10. The plate with its one or more joints may now be adhesively mounted. It will be appreciated that subsequently, when the joint thus formed in an installed plate 10 is to support an article 34, for example, a nut 36 (FIG. 3) may be easily threaded onto the screw 22, the latter being held from turning by reason of the resistance to rotation afforded by the upset eyelet. Threading on of the nut 36 is effective moreover to draw the screw head 24 further into the material 14, its surface 16 remaining in securely adhered relation to the supporting structure even though the latter may have a rough surface.

Figure 3:
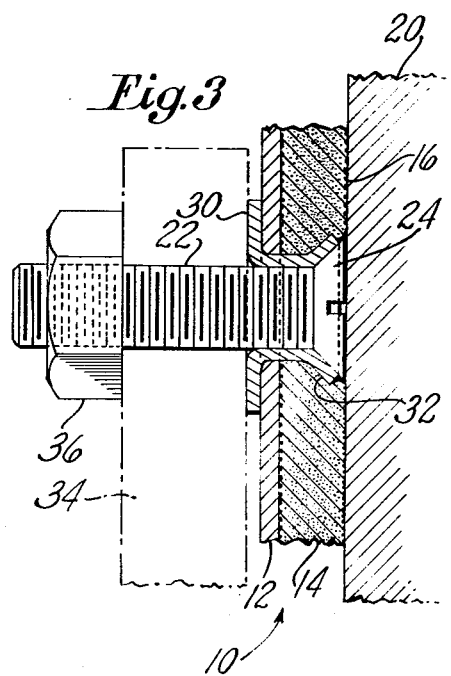
FIG. 3 is a view similar to FIG. 2 but showing the completed joint and indicating how a nut may secure an article on the mounted threaded element of the joint.
Figure 4:
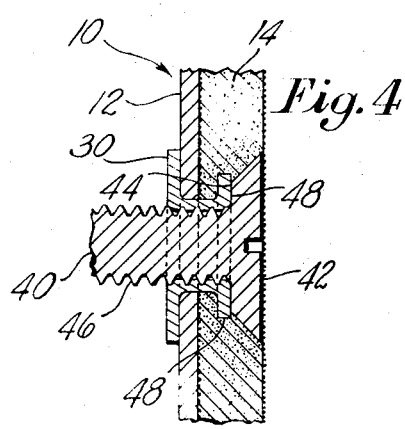
FIG. 4 is a sectional view of a modified and often preferred form of the novel joint.

A joint illustrated in FIG. 4 resembles that of FIGS. 1–3 in structure except as will now be noted. A screw 40 has a truncated conical head 42, and a radial or undercut upsetting shoulder 44 forming the base of the head 42 extends substantially at right angles to a threaded stem 46. By reason of greater axial compression exerted during installation on the telescoped eyelet barrel, which initially has an internal diameter only very slightly greater than the stem 46, the eyelet barrel is internally meshed with and locked on the screw thread, and a more abrupt anchoring flange 48 is formed on the hidden barrel end. The joint shown in FIG. 4 has an advantage in that the compressible material 14 may be thinner and still permit the head 42 to be fully recessed therein.

Having thus described my invention, what I claim as new and desire to secure by Letters Patent of the United States is:

1. For use in a work piece having a rigid side and a relatively yieldable side, a joint comprising a headed bolt provided with a threaded stem extending through an aperture of the work piece, and a tubular metal fastener telescoped on said stem and having a preflanged end abutting the rigid side, the length of the fastener being less than that of the aperture, the ends of the fastener axially clamping the work piece, and the internal wall of the fastener having gripping engagement with the threads of said bolt stem.

2. A joint for mounting in an aperture of a plate having a soft side and a hard side comprising, a screw inserted in the aperture and having a head formed with an abrupt shoulder, said screw head being recessed in the soft side of the plate, and an eyelet having its barrel length less than the length of the aperture and its preformed flange abutting said hard side, an internal hidden end of the barrel of the eyelet having axially upset relation with said shoulder of the screw clamp together hard and soft portions of the plate, the barrel having an internal wall portion deformed radially for meshing with the thread of the screw.

3. In a composite plate having one side hard and an opposite side relatively soft, a joint including an eyelet and a screw in telescoping relation, a truncated conical head of the screw recessed in the soft side of the plate and having its base in radial upsetting engagement with an internal non-exposed clamping flange of the eyelet, the arrangement being such that a preflanged end of the eyelet abuts the hard side of the plate, the length of the barrel of the eyelet is less than the length of a mounting aperture in the plate, and the interior of the eyelet barrel engages the thread of the screw to hold it against turning when a nut is mounted thereon.

4. A two-piece fastener assembly for mounting for projection from a rigid side only of a composite panel having an opposed relatively yieldable side, said assembly comprising a headed bolt extending through an aperture in the panel, and a metal eyelet with a barrel less in length than the length of said aperture, said eyelet having a hidden internal end and a preflanged external end abutting the rigid side, the head of the bolt recessed in said yieldable side and having flaring engagement with the hidden end of the eyelet.

References Cited

UNITED STATES PATENTS

| 2,296,470 | 9/1942 | Keehn | 287—189.36 |
| 3,029,912 | 4/1962 | Barker | 287—189.36 |
| 3,299,766 | 1/1967 | Gould et al. | 85—50 |

FOREIGN PATENTS

| 1,320,197 | 1/1963 | France. | |

CARL W. TOMLIN, *Primary Examiner.*

EDWARD C. ALLEN, *Examiner.*

W. L. SHEDD, *Assistant Examiner.*